May 5, 1953 C. E. NAGEL 2,637,361
SELF-LOCKING SETSCREW
Filed June 25, 1951
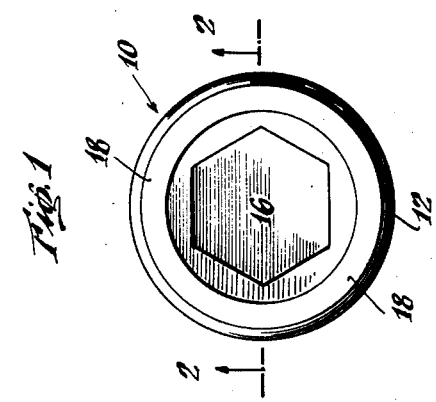
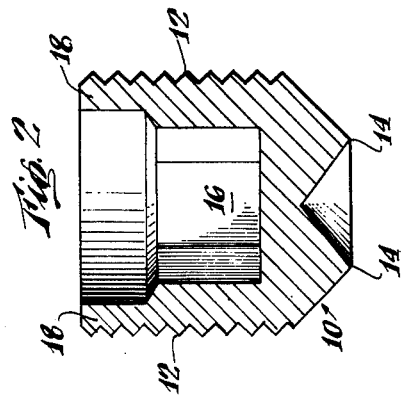
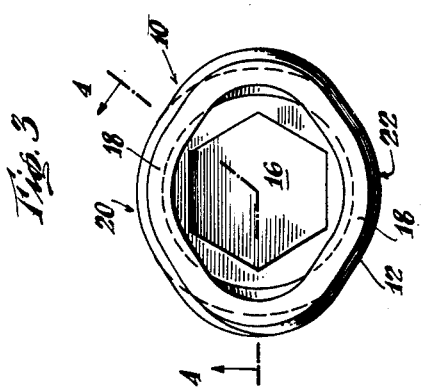
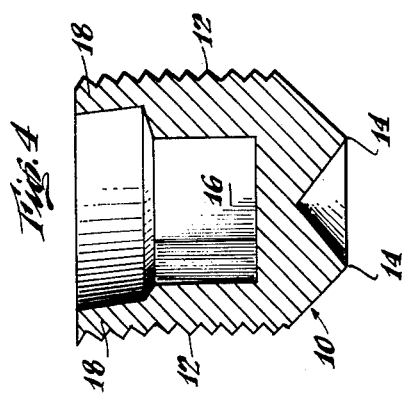
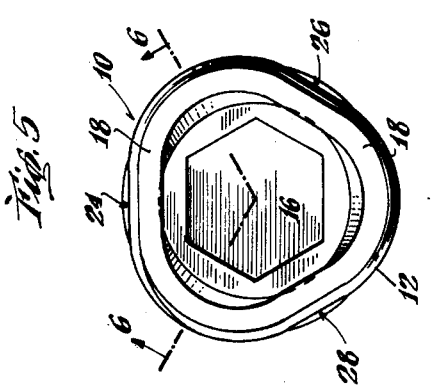
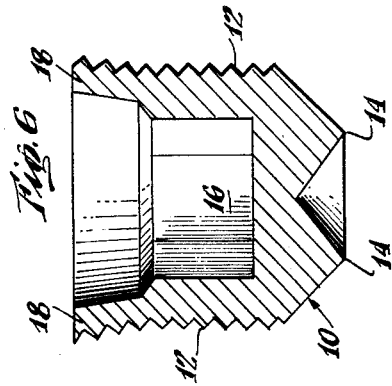
INVENTOR.
Charles E. Nagel
BY
R. J. Dearborn
ATTORNEY Patented May 5, 1953

2,637,361

UNITED STATES PATENT OFFICE 2,637,361

SELF-LOCKING SETSCREW

Charles E. Nagel, New York, N. Y.

Application June 25, 1951, Serial No. 233,325

3 Claims. (Cl. 151—21)

This invention pertains to a set screw, and more particularly relates to a self-locking set screw.

Great quantities of set screws are used without nuts where they enter tapped holes in machines and mechanisms of various kinds. For such use, it is necessary that means be provided for locking the set screw in place to prevent it from being loosened by vibration and falling out.

My set screw embodies self-locking means of a particularly simple and effective character. Briefly my invention comprises a set screw having an externally threaded cylindrical body with a point or sharp annulus at the inner end, a hexagonal, splined or other multisided socket centrally located in the body and preferably somewhat deeper than in a conventional screw of this kind, and adapted for engagement by a socket wrench in the usual manner. The socket is counterbored at the outer end of the screw so that the walls of the set screw at this point are relatively thin and flexible. These thin walls are deformed before the screw is hardened by a slight inward crimping thereof, or by forcing a punch or mandrel into the opening so as to swage or expand the walls outwardly. Thus the outer end may be formed into an elliptical or triangular shape, and it is this deformation which produces the desired self-locking characteristic in the finished screw.

Accordingly, it is an important object of my invention to provide a set screw with a simple and effective self-locking means which does not add materially to the cost of manufacture.

The above and other objects and advantages will appear more clearly from the following description taken with the accompanying drawings in which:

Fig. 1 is an end view of the set screw of my invention in an intermediate stage of its construction before the outer end has been deformed;

Fig. 2 is a sectional view taken on line 2—2 of Fig. 1;

Fig. 3 is an end view of a finished set screw having a two-way deformation of the upper rim;

Fig. 4 is a sectional view taken on line 4—4 of Fig. 3;

Fig. 5 is an end view of a finished set screw having a three-way deformation of its upper rim; and Fig. 6 is a sectional view taken on line 6—6 of Fig. 5.

Like reference characters denote like parts in the various views.

Referring to the drawings, Figs. 1 and 2 show a set screw before deformation having a cylindrical body 10 which is provided with external threads 12 along its sides and a cup or sharp annulus 14, or other usual form such as a point, a round, or a dog (not shown) at its inner end. Located centrally of the body 10 is a socket 16 which, as shown, is hexagonal and adapted for engagement by a hexagonal socket wrench (not shown). The socket may have a splined or other multisided form as is usual in such screws. The socket 16 is preferably located deeper in the body 10 than is the case in a conventional set screw, and the outer end of the screw is counterbored to form a relatively thin cylindrical rim 18 above the socket 16. The rim 18 is thin enough to be slightly flexible.

To provide the self-locking characteristic, the rim 18 is slightly deformed by any suitable swaging or crimping process.

As shown in Figs. 3 and 4, the swaging or crimping may be two-way, as by slightly squeezing the rim inwardly at diametrically opposed locations 20 and 22.

As shown in Figs. 5 and 6, the crimping may be three-way, as by slightly squeezing the rim 18 inwardly at locations 24, 26 and 28 which are separated by 120 degrees. The desired deformation may be produced by forcing a mandrel or swaging tool of suitable shape into the counterbore. At present I prefer the three-way deformation.

In operation, when my set screw, having either a two-way or three-way deformation is screwed into a tapped hole, the deformation of the rim 18 will be forced into the cylindrical tapped hole and the resiliency of the deformed walls will produce the desired locking characteristic.

Since the outer rim is counterbored and the deformation is slight, the deformation in no way interferes with inserting or removing the wrench.

While the set screw of my invention is preferably hardened after the outer rim is deformed to make the locking effect more permanent, this is not essential and its desirability depends upon the steel or other material of which it is made.

It is to be understood that I do not limit myself to the details set forth above except as defined by the following claims.

Having thus described my invention, I claim:

1. A self-locking set screw consisting of an externally threaded substantially cylindrical body having a substantially cylindrical counterbore at its outer end forming a relatively flexible uninterrupted annulus and a co-axial non-circular hole smaller than said counterbore extending from the bottom of said counterbore to receive a socket wrench inserted through said counterbore, at least a portion of the flexible uninterrupted annulus formed by the counterbore being offset beyond the normal periphery of the screw.

2. The invention set forth in claim 1 wherein two opposite portions of the flexible uninterrupted annulus are offset beyond the normal periphery of the screw.

3. The invention set forth in claim 1 wherein three uniformly spaced portions of the flexible uninterrupted annulus are offset beyond the normal periphery of the screw.

CHARLES E. NAGEL.

References Cited in the file of this patent

UNITED STATES PATENTS

| Number | Name | Date |
| --- | --- | --- |
| 1,874,657 | Trotter | Aug. 30, 1932 |
| 2,135,637 | Gade | Nov. 8, 1938 |
| 2,355,253 | Whitfield | Aug. 8, 1944 |
| 2,414,870 | Harding | Jan. 28, 1947 |
| 2,428,783 | Cole | Oct. 14, 1947 |